Patented July 2, 1940

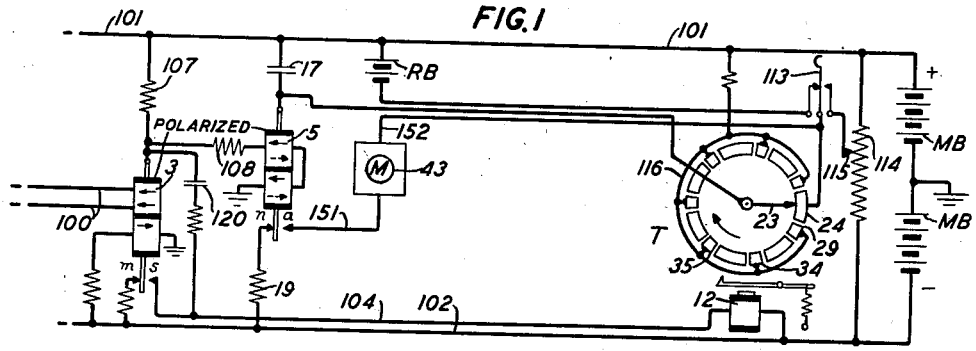

2,206,452

UNITED STATES PATENT OFFICE 2,206,452

TELEGRAPH TESTING SYSTEM

Samuel I. Cory, Towaco, N. J., assignor to Bell Telephone Laboratories, Incorporated, New York, N. Y., a corporation of New York Application February 23, 1939, Serial No. 257,803

5 Claims. (Cl. 178—69)

This invention relates to telegraph testing apparatus and more particularly to apparatus for and methods of measuring signal distortion in telegraph systems.

It is an object of the invention to provide a testing equipment whereby different types of distortion suffered by telegraph signals during transmission over a circuit may be conveniently separated and quantitative indications of the distorting effects obtained by means of meters.

It is a particular object of the invention to provide a testing equipment, such as just referred to, which is simple and accurate and of such low weight that it will be portable enough for use in the telegraph subscribers' stations.

The invention is related to the invenion disclosed in U. S. Patent 2,132,678 issued to F. A. Cowan October 11, 1938, and is in the nature of an improvement on Cowan's system.

The testing equipment disclosed by Cowan in the patent just referred to is adapted to test telegraph signals composed of alternate characteristics, usually termed marking and spacing impulses, and particularly to give a quantitative indication of the displacement from their normal timing of the transiions between impulses of alternate characteristics due to the distorting properties of the transmission circuit. The system has receiving equipment for the incoming signals which includes two test condensers, namely, a marking condenser which receives charges of magnitudes determined by the displacement of transitions from marking to spacing impulses, and a spacing condenser receiving charges of magnitudes determined by the displacement of transitions from spacing to marking impulses. The beginning of the charging period for each condenser is determined by a timing device having contacts connected in the charging circuit and is timed to occur uniformly about midway between the transition points of undistorted signals. The charging is discontinued at the time of the transition at the end of the impulse whereupon the condenser is connected to a meter circuit for comparison of its charge with a source of reference potential, adjusted to represent undistorted impulses. Thus, in the arrangement disclosed by Cowan the marking and spacing test condensers each acquire a charge which is proportional to the time elapsed between a standard reference instant and the instant of the next succeeding corresponding transition. During the period of comparison with the reference potential the charge on the condenser causes an equalizing current to flow between the reference potential and the condenser, giving an indication on a meter.

In accordance with the present invention, a similar testing equipment includes receiving equipment for contol of the charge on a single test condenser both for transitions from marking to spacing and for transitions from spacing to marking. The receiving equipment comprises an impulse circuit for temporarily operating a switching relay which controls the condenser charging circuit and a condenser comparison circuit in response to transitions from marking to spacing and from spacing to marking. The condenser is intermittently discharged and commences its charging under control of a timing device and at equally separated reference instants determined by the timing device and corresponding to the center of standard undistorted impulses. In response to each transition to marking and to spacing, the single test condenser is temporarily removed from the charging circuit and connected to the meter circuit for comparison of its charge with the reference potential.

Thus, in accordance with the invention, the charge on the test condenser is proportional to the elapsed time between a reference instant determined by the timing device and the instant of an immediately succeeding transition to marking or spacing of the incoming signals. The charge on the test condenser is measured during the comparison period on a meter connected in circuit with a source of reference potential.

In accordance with Cowan's disclosure referred to, the timing device is effective during each successive impulse period in discharging one or the other condenser and the idle one of the condensers remains connected to the reference potential while the active condenser is successively charged and discharged when successive impulses are received with the same characteristics without transitions between them.

In accordance with the present invention, the timing device may be of any type having a rotating element and contacts for intermittently closing a circuit at uniform intervals and under control of the rotating element and, thus, may be similar to that disclosed by Cowan; the contacts of the timing device are, however, connected to intermittently discharge the test condenser during each impulse period.

The source of reference potential may be a condenser whose charge is varying in accordance with the average charge on the test condenser during successive signals, as disclosed by Cowan in the patent referred to; it is, however, preferred to use a constant potential battery similar to that disclosed by Cowan. When the test set is used with a central office battery with appreciable variation in over-all potential, the charge on the test condenser at the end of the test period would depend upon the potential of the central office battery and errors due to this cause may be practically eliminated by connecting a potentiometer across the central office battery and connecting the potentiometer point into the meter circuit to replace the reference battery; in this case the comparison potential obtained from the potentiometer would vary with the potential of the main battery and practically by amounts equal to the variations in the condenser potential at the end of a normal charging period due to the variations in the potential of the main battery.

Other features of the invention will be apparent from a study of the following detailed description of the invention and its operation as applied to a specific preferred embodiment. Reference will be made to the accompanying drawing in which:

Fig. 1 is a simplified schematic circuit diagram of a testing equipment for measuring distortion in telegraph signal impulses in accordance with the invention;

Fig. 2 shows details of a meter circuit which may be used with the circuit arrangement shown in Fig. 1;

Fig. 3 is a diagrammatical showing of the current in the test condenser at different times during a signal series of impulses; and Fig. 4 shows details of a relay circuit which may be substituted for that shown in Fig. 1.

Referring first to Fig. 1, the invention is illustrated as applied to a test system especially adapted for testing distortion effects in telegraph systems operating on signals of the well-known start-stop type.

The system comprises a polar receiving relay 3 having its upper operating winding connected over conductors 100 to the telegraph system under test in any desired manner. The operating winding is connected in such a manner that it tends to operate the relay armature to the marking contact m. The relay has a lower biasing winding normally energized and tending to operate the armature to the spacing contact s. In normal or stop condition of the telegraph system under test, the circuit will be in marking condition with a normal current flowing through the operating winding of relay 3 of sufficient strength to overcome the biasing winding and hold the armature on contact m. When a spacing or no-current impulse is received over conductors 100, the biasing winding quickly operates the armature to contact s; when a marking or current impulse is again received the operating winding will overcome the biasing winding and operate the armature to contact m.

Thus the operations of relay 3 take place immediately after transitions to marking and to spacing in the telegraph signals.

The test set includes a timing device T having a rotating element 23, driven at constant speed from any convenient power supply, and a stationary set of contacts arranged for engagement by the element 23. The element 23 may be in the form of an arm carrying a brush for engagement with the successive stationary contacts during its rotation; the arm 23 is normally stationary and is released by a start-stop mechanism to make one revolution in response to a start impulse received by the magnet 12. During each revolution the brush will successively engage the short contact elements 29, 34, 35, etc., in isocronism with the impulses contained in a signal series representing a character. Thus, in the usual case of a seven-unit start-stop code comprising a start impulse, five character impulses and a stop impulse, the brush will engage seven short segments during one revolution. The device is oriented so that the first contact segment 29 will be engaged at an instant separated from the instant of starting by approximately half a normal dot period, that is, half the length of a normal undistorted impulse. In this manner the brush 23 engages a short stationary segment at definite reference instants occurring at the middle of normal impulse periods corresponding to undistorted signals. Thus, after a received start impulse, reference instants are established in the test circuit corresponding to the middle portion of undistorted impulses and they may be used for comparison of ordinary operating signals to determine whether or not their timing differs from that of undistorted signals and to what extent.

The winding of magnet 12 is connected to the spacing contact of relay 3 to respond to a start impulse incoming over circuit 100, at which time the start-stop mechanism will be released and cause the brush 23 to rotate.

Polar switching relay 5 has an operating winding connected from intermediate or ground potential to a bridge circuit comprising resistances 107 and 108, of which resistance 107 is connected to plus battery and the point between resistances 107 and 108 is normally connected over the marking contact of relay 3 to minus battery. Thus, relay 5 will normally be operated from minus battery to close its normal contact n and when relay 3, in response to a transition, opens its marking contact, plus battery over resistance 107 will operate relay 5 to close its alternate contact a. When the armature of relay 3 after the travel time reaches the spacing contact, minus battery will again be applied through magnet 12 over spacing contact of relay 3 to relay 5, causing relay 5 to return to normal. Relay 5 will be similarly operated when relay 3 operates from spacing to marking.

The system includes a test condenser 17 intermittently connected in a short circuit over one of the short segments 29, 34, etc., of timing device T and conductor 101. When the timing device T opens the short circuit, the condenser 17 will be connected from plus battery over conductor 101, contact n of relay 5 and high resistance 19 to conductor 102 leading from minus battery and the condenser commences to charge. When relay 5 operates to open its contact n during the traveling time of relay 3, the charging circuit through the condenser 17 will be opened to interrupt the charging current. Thus, the beginning of a charging period is determined by the timing device T at the instant of a standard reference time and the charging period is discontinued by relay 5 in response to a transition in the signals under test; the magnitude of a charge on condenser 17, therefore, will depend upon the interval between a reference instant and the immediately succeeding transition instant. The timing device is oriented so that in the absence of distortion in the signals under test the charging period will be about equal to half the normal dot period of the signaling less half the width of a short segment and the condenser 17 will acquire a normal charge; but if the transition occurs earlier or later than normal, due to distortion in the signals under test, the charge on condenser 17 will be correspondingly smaller or larger, respectively.

The system includes a comparison or meter circuit for condenser 17 comprising a reference battery RB of exactly the same potential as the normal potential acquired by condenser 17 with undistorted signals and a meter 43 connected in any desired manner to give an indication of the currents in the circuit of battery RB. The comparison circuit is connected over conductor 151 to alternate contact $a$ of relay 5 so that when relay 5 operates to contact $a$ the potential of condenser 17 will be pitted against the potential of battery RB. For undistorted signals no current will flow in the meter circuit. However, if the potential of condenser 17 be greater or smaller than that of battery RB an equalizing current will flow in one direction or the other in the meter circuit thus giving an indication of the distortion in the signals under test by the movement of the meter needle over the suitably calibrated scale of the meter.

It will be noted from Fig. 1 that all the relays are operated over conductors 101 and 102 from main battery MB, the mid-point of which is grounded, and that the charging circuit for condenser 17 also receives current from the main battery over conductor 102 to ground. The operating winding of relay 3, of course, may be supplied with current from main battery MB or from some other convenient source in the incoming circuit 100. The potential of each half of the main battery may conveniently be 130 volts, as in general practice, so that no particular danger is introduced in the manipulation of the test set and no special precautions against excessive shocks need be provided.

Referring now more particularly to Fig. 2, this figure shows a meter circuit especially adapted to operate with Fig. 1. This circuit may be connected into Fig. 1 by connecting its input circuits 151 and 152 to conductors 151 and 152 in Fig. 1; the battery conductors 101 and 102 are the same as shown in Fig. 1.

The meter circuit in Fig. 2 comprises an input transformer 36 having its primary winding included in the comparison circuit from contact $a$ of relay 5 through reference battery RB shown in Fig. 1. The secondary winding of transformer 36 is connected through a full wave rectifying equipment 46, 47 of any convenient design to the grid or control element of a vacuum tube 49 included in the bridge circuit for the meter 43. The rectifying equipment 46, 47 may be similar to that used in the meter circuit disclosed in the Cowan patent referred to above. The bridge circuit for the meter comprises three resistance arms 57, 57 and 55 and a fourth arm including the vacuum tube 49; the meter 43 is connected between conjugate points of the bridge and the supply points of the bridge are connected to battery over conductors 101 and 102. The vacuum tube has its cathode-anode circuit connected directly in the bridge circuit for control by the grid element over a grid circuit including a small condenser 48. The normal negative grid potential is supplied by means of potentiometer 118. A bias indicating meter 42 is serially included in the comparison circuit.

When undistorted signals are being tested there will be no current in the primary and secondary windings of transformer 36 and the condenser 48 will remain uncharged so that the grid of tube 49 will be at normal potential. Under this condition a balance exists in the meter bridge and the meter gives zero reading. When distorted impulses are received, currents in one direction or the other will flow in the windings of transformer 36; the current in the secondary winding will be rectified through the equipment 46, 47 and a charge quantity corresponding to the degree of distortion will be quickly impressed upon condenser 48, which in turn changes the grid potential of tube 49 thereby disturbing the balance in the meter bridge and giving a reading on the meter 43. The meter 43 is of a type that is highly sensitive and will respond to successive charges on condenser 48. By proper calibration of the meter scale the readings may indicate directly the distortion in per cent to conform with general practice. The condenser 48 retains its charge so that normally the meter will show a continuous reading which will be increased each time a larger charge is impressed upon condenser 48 thus indicating the peak value of the distortion. Condenser 48 may be discharged, where desired, by means of key 59.

The operation of the system during the test of a start-stop signal series of impulses will now be described through its successive stages.

It will be assumed that the circuit shown in Fig. 2 is connected by means of conductors 151 and 152 to the circuit in Fig. 1 and that the set is in rest condition and therefore is in the condition shown in Figs. 1 and 2.

The set will be described as operating in response to a signal series, such as indicated at A in Fig. 3. In this diagram the uniformly distributed normal transition points of an undistorted start-stop signal series of impulses are indicated by the vertical dotted lines 7, 1, 2, 3, 4, 5, 6. The signal series A will be assumed to include the start transition from mark to space, no transition at point 1, space to mark transition II arriving on time, mark to space transition III arriving slightly late with respect to the normal point 3, space to mark transition IV more delayed than transition III, mark to space transition V arriving earlier than the normal point 5, and the stop transition slightly earlier than point 6. The start transition of the next succeeding signal series is shown at the extreme right.

At B in Fig. 3 there is shown a curve representing the varying potential of condenser 17 during the complete signal series shown at A. The uniformly distributed reference instants 7′, 1′, 2′, 3′, 4′, 5′, 6′ are those established by the timing device 16. For the sake of simplicity the curve B has been shown as being composed entirely of straight-line portions. As is well known, however, the potential of the condenser will not vary in direct proportion to time when the condenser charges or discharges against a constant potential; and the curvature of the potential curve will be the greater the more resistance is included in the condenser circuit and it increases with the time during a particular operating period. In the present arrangement only the charging circuit contains appreciable resistance, but by applying a high charging potential, in the present embodiment equal to 230 volts, and charging the condenser to a comparatively low normal potential of about 50, the portion of the charging curve utilized for the tests will be substantially linear. The curve B thus is a substantially true representation of the actual performance.

To simplify the understanding of the operation of the invention the reference instants 1′ to 6′, shown at B, are those at which the timing device T opens the discharge circuit for condenser 17 to commence the charging period, and the transition points of the signal under test, shown at A, correspond to the instants at which relay 5 opens its contact n to discontinue the charging period of condenser 17. Thus the reference instants occur at uniform intervals about equal to half a normal dot period, before the corresponding normal transition points.

Referring now to Figs. 1 and 2, the system is assumed to be at rest, under which condition the upper winding of relay 3 is receiving a marking or current impulse and condenser 17 is charged to a potential equal to that of the reference battery RB, being connected for this purpose over the wiper 23 and normal segment 24 of the timing device T, over normal contact of key 113 to the reference battery RB.

When the start or no-current impulse arrives over conductors 100 the current in the upper winding of relay 3 reduces to zero and relay 3 is operated to spacing by its lower biasing winding. When relay 3 opens its marking contact minus battery is removed from the bridge circuit 107, 108 causing relay 5 to operate in a circuit from plus battery over resistances 107 and 108.

Switching relay 5 in operating opens at contact n the charging circuit for condenser 17 which at this time has no effect upon the condenser 17, the latter having a potential equal to the constant reference potential p indicated in the diagram of Fig. 3 by a horizontal dot-dash line. When relay 5 closes its a contact, condenser 17 will be connected through the primary winding of transformer 36 and meter 42 to the reference battery; due to the temporary short circuit over contact 24 of the timing device T no current will flow at this time in the meter circuit 151, 152.

When relay 3 reaches its spacing contact it connects minus battery through magnet 12 to the bridge circuit 107, 108 again causing relay 5 to return to normal; thus relay 5 opens the comparison circuit at contact a and restores the charging circuit at contact n. At the same time magnet 12 operates the starting mechanism of timing device T to release the brush arm 23 for rotation through one revolution. When the wiper 23 reaches the short reference segment 29 the stop connection between reference battery RB and condenser 17 is opened and the condenser is fully discharged over segment 29 and conductors 116 and 101. As the brush 23 leaves segment 29 this short circuit for condenser 17 is opened thereby permitting the condenser to charge over resistance 19. This corresponds to the point 1' in Fig. 3. By proper orientation of timing device T the lapse between points 1 and 1' is about equal to half of the normal dot period plus half the width of segment 29. This is the condition of the circuit at transition point 1. Since no transition takes place at this time condenser 17 will continue to charge until the brush 23 reaches the next reference segment 34, when condenser 17 will be discharged over conductors 116 and 101. As wiper 23 leaves segment 34 the short circuit for condenser 17 is again opened and the condenser again commences to charge over resistance 19. This corresponds to point 1' in Fig. 3.

At transition point 2 a space to mark transition II occurs without distortion. Relay 3 now leaves from spacing to marking and during the travel time of its armature temporarily removes minus battery from bridge circuit 107, 108 thereby again permitting relay 5 to operate.

Relay 5 thus opens the charging circuit for condenser 17 which corresponds to point 2 in Fig. 3. Relay 5 again connects condenser 17 to the comparison circuit but since transition II arrives on time the condenser 17 will have been charged to a point where its potential will be exactly equal to the reference potential p. No current therefore will flow in the meter circuit 151, 152 during the comparison interval from a to b in Fig. 3.

When relay 3 reaches its marking contact, minus battery is again applied to the bridge 107, 108 thereby operating relay 5 back to normal. When relay 5 closes normal contact n, at point c in Fig. 3, condenser 17 will continue to charge until the timing device T again discharges condenser 17 due to the wiper 23 passing over the reference segment 35.

The same series of operations is repeated for each of the following transitions: III, to spacing; IV to marking; V to spacing; "stop" to marking. However, since each of these transitions has been subjected to distortion the charging time for condenser 17 will each time be either lengthened or shortened so that the potential on condenser 17 will be higher or lower respectively than the reference potential of battery RB. Thus since transition III arrives later than the transition point 3, the operation of relays 3 and 5 will be delayed and the charging of condenser 17 will be discontinued a time $t-3$ later than the normal transition instant 3. Since relay 5 opens the charging circuit at the transition III the potential on condenser 17 will be higher at this moment than the reference potential p. An equalizing current will therefore flow between condenser 17 and battery RB through the primary of transformer 36 and meter 42 during the comparison time $a-b$ until the potential on condenser 17 is equal to that of battery RB.

Due to the equalizing current in the primary winding of transformer 36 a current will be induced in the secondary winding which will flow over a circuit from one or the other terminal of the secondary winding, depending upon the direction of the current through the rectifying equipment 46 or 47, and condenser 48 back to the mid-point of the secondary winding. Assuming that condenser 48 has previously been entirely discharged through a temporary closure of key 59 the charging current now applied, due to transition III, will raise the potential of condenser 48.

With normal negative potential on the grid element of vacuum tube 49 the bridge circuit is adjusted so that no current will flow in meter 43. The meter is calibrated to indicate zero distortion under this condition. When the negative potential on the grid is increased due to a charge on condenser 48 the current in the anode-cathode circuit of tube 49 will be increased and the meter will give a reading in per cent distortion corresponding to the charge on condenser 48 and therefore to the delay of transition III with respect to normal transition point 3. In accordance with standard practice the meter reading will indicate the delay interval in per cent of the normal dot period.

At the time transition IV arrives delayed with respect to the normal transition instant 4 by the time $t-4$, the operations are again repeated. Since the time $t-4$ is longer than the time $t-3$ the potential on condenser 17 will rise to a point still higher than in the case of transition III when relay 5 opens the charging circuit. Thus during the comparison time $a-b$ the current through the primary winding of transformer 36 will be greater than in the case of transition III. The charge on condenser 48 will now be increased still further and the meter 43 will indicate a correspondingly higher percentage of distortion.

Transition V is assumed to arrive earlier than the normal transition 5 by a period $t-5$ about equal to the period $t-4$. Since in this case relays 3 and 5 will be operated to open the charging circuit for condenser 17 earlier than the normal transition instant 5, the potential on condenser 17 will rise to a point lower than the reference potential $p$ when relay 5 opens the charging circuit at the transition V. During the comparison period $a-b$ an equalizing current will therefore flow through the primary winding of transformer 36 in the opposite direction of the equalizing currents at the transitions III and IV The current in the secondary winding will also be reversed but will be rectified by the equipment 46 or 47 to charge condenser 48 in the direction as before Since the distortion of transition V is equal to that of transition IV, except for it being in the opposite direction, the charge on the condenser 48 will be the same as before and the meter 43 will show the same percentage of distortion.

Similar conditions prevail when transition 25 "stop" arrives slightly earlier than the normal transition instant 6, except that the potential induced in the secondary winding of transformer 36 due to the smaller equalizing current will be smaller than the potential already existing on condenser 48. No current therefore will flow in the secondary circuit and the meter reading remains the same as for transition IV.

Shortly after the comparison period for the stop transition has been completed, the arm 23 of timing device T will have completed a revolution and will be automatically stopped by the start-stop mechanism. The test system is then ready for the next impulse series.

It is thus apparent that a transition of a greater distortion than a previous transition will increase the meter reading independently of the direction of the distortion and that a transition of less distortion than the previous transition will not affect the meter reading. The meter therefore indicates the peak distortion of a series of signal impulses.

As is well known, an impulse of equalizing current through the primary of transformer 36 tends to first induce a strong current impulse in one direction and then a weaker secondary impulse in the opposite direction during a discharge period of condenser 17. These currents would normally both be rectified and flow from one half or the other of the secondary winding of transformer 36 through the condenser 48. However, since the first stronger impulse impresses a comparatively high potential on condenser 48 the lower potential of the second weaker induction will have no effect on condenser 48 and will not affect the meter reading.

The meter circuit 151, 152 includes a meter 42 which responds to the equalizing current during each comparison period and thus is subject to currents of varying intensities and flowing in both directions. This meter therefore may be calibrated to indicate the average distortion of the signal impulses.

It has been found in practice that the main battery of a telegraph office varies considerably in potential. Thus a battery rated at 260 volts may vary in potential across its terminals as much as ±5 per cent. It is therefore evident that the charge on condenser 17 during a given time interval will vary at the same rate and that therefore the meter readings under such conditions would be inaccurate. This difficulty may be substantially overcome by the use of a reference potential in the comparison circuit which would vary in proportion to the variations in potential of the main battery. For this purpose a potentiometer 114 is connected across the main battery with an adjustable point 115 connected over key 113 in its alternate position to the meter circuit 152, 151. In the alternate position of key 113 the reference battery RB is disconnected from the meter circuit. The potential at point 115 applied to the meter circuit will be adjusted to be equal to the normal reference potential at normal potential of the main battery in which case the conditions will be identical with those described above when the reference battery RB is used. When now the main battery changes in potential the charge on condenser 17 during a charging period would be correspondingly changed from the normal value corresponding to a given distortion, but during the comparison period condenser 17 will be pitted against the potential at point 115 which has been correspondingly varied from the normal value. The equalizing current therefore will be substantially unaffected by the potential variation of the main battery and the meter will give true readings.

The manner of operating relay 5 in response to operations of relay 3 may be varied in different ways. Thus, Fig. 4 shows a circuit arrangement for this purpose which may be substituted for that shown in Fig. 1. In this alterative form relay 5 has a lower operating winding connected from ground through resistance 112 over marking contact of relay 3 and over conductor 102 to main battery MB. This winding tends to operate relay 5 to its normal contact $n$. The upper biasing winding of relay 5 is permanently connected over resistances 111, 109 and conductor 101 to plus battery. When relay 3 operates to open its marking contact the lower operating winding will receive current over resistance 112, 110, 109 from plus battery in a direction to aid the upper winding thereby operating relay 5 to its alternate contact $a$. When relay 3 closes its spacing contact the lower winding of relay 5 again receives current from minus battery through magnet 12, conductor 104 and spacing contact of relay 3, this current being strong enough to overcome the biasing winding and return relay 5 to normal. These operations will be repeated when relay 3 operates back to marking.

In a system connected in accordance with the circuit shown in Fig. 4 the following constants have been found to give satisfactory operations with standard relays:

Main battery _____ volts__ ±130
Resistance 109 _____ 150ω
Resistance 110 _____ 3900ω
Resistance 111 _____ 3000-3800ω
Resistance 112 _____ 1500ω

With a speed of operation corresponding to a 23-cycle dot frequency, i. e., corresponding to 23 normal impulses per second the comparison interval will vary between 6 and 10 per cent of the dot period as resistance 111 is varied from 3800 to 3000 ohms. A 10 per cent comparison time, during which relay 5 rests securely against contact $a$, will have a duration of .0011 second. The effective operating current in the lower operating winding of relay 5 in this circuit will be 56 mils for operation to contact $n$ and 17 mils for operation to contact $a$.

What is claimed is:

1. A method of measuring distortion effects upon signal impulse series having marking and spacing characteristics in a telegraph system which comprises alternately charging in one direction and discharging one condenser at uniform intervals equal to the normal dot period, and at the time of each transition to marking and to spacing of a series of impulses equalizing the potential of the condenser with the potential of a reference source, and measuring the equalizing current.

2. A method of measuring distortion effects upon signals each having marking and spacing impulses in a telegraph system which comprises fully discharging a condenser once during each dot period of the signaling, commencing to gradually charge the condenser at a predetermined instant during each dot period, discontinuing the charging of the condenser in response to each received transition to marking and to spacing, and immediately thereafter comparing the charge on the condenser with a reference potential through a meter circuit.

3. A telegraph transmission testing system comprising a test condenser, a charging circuit for said condenser including a source of substantially constant charging potential, a discharging circuit for said condenser, a meter circuit including a meter and a source of reference potential, switching relay means having contacts for normally connecting said condenser to said charging circuit and alternately to said meter circuit, receiving relay means having contacts connected for temporary operation of said switching relay means to its alternate contacts in response to each transition to marking and to spacing of a signal impulse series, and timing means having contacts for intermittently connecting said condenser to said discharging circuit to time each charging period to begin at predetermined uniform intervals each equal to the dot period.

4. A telegraph transmission testing system in accordance with claim 3 which further comprises a bridge circuit included in the connection between said switching relay means and said receiving relay contacts for supplying current in one direction through said switching relay means when said receiving relay means is at rest in either position and in the opposite direction during the travel time between positions of said receiving relay means for the said temporary operation of said switching relay means.

5. A telegraph transmission testing system in accordance with claim 3 which further comprises a potentiometer resistance connected across said source of charging current and having a potentiometer point and in which said source of reference potential is comprised in the resistance between said point and one terminal of said potentiometer resistance.

SAMUEL I. CORY.